Figure 1:
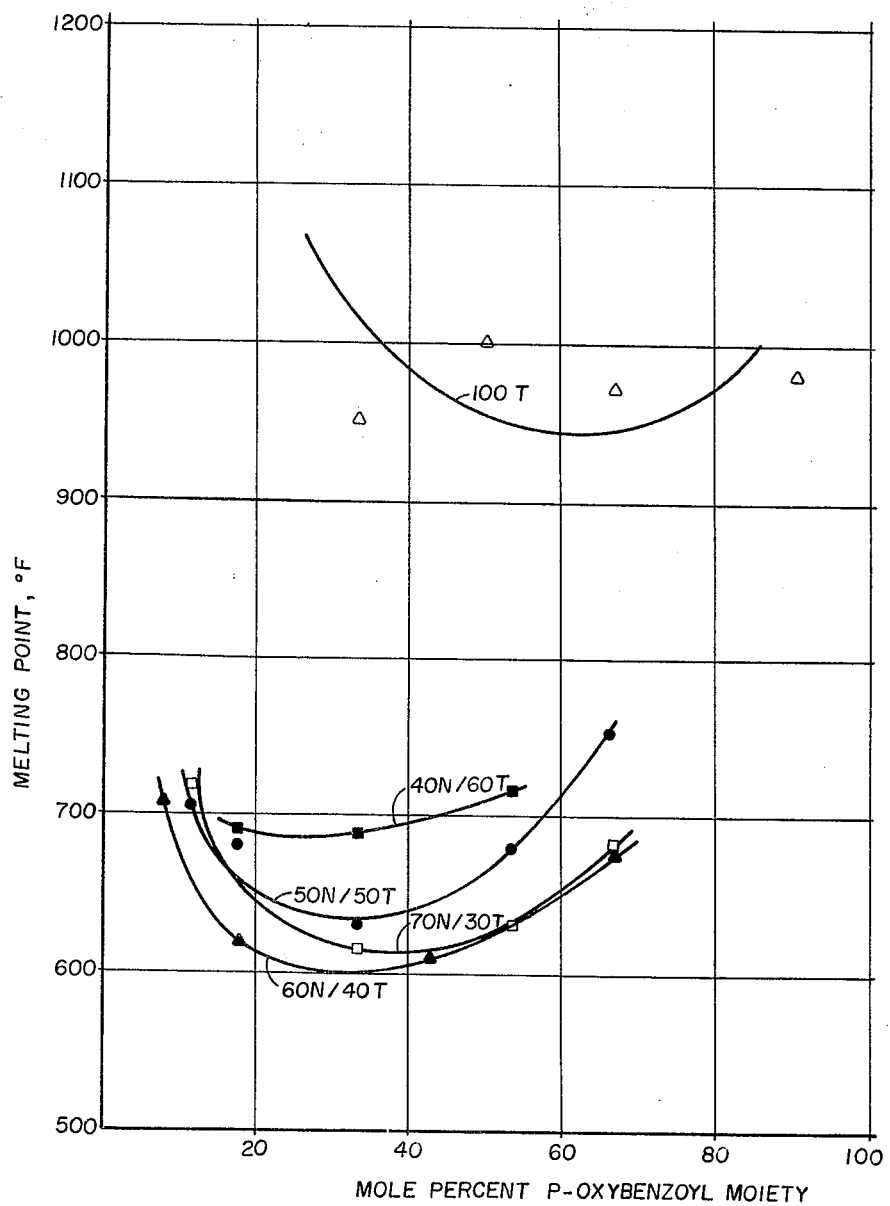

United States Patent [19]

Jackson, Jr. et al.

[11] 4,169,933

[45] Oct. 2, 1979

[54] LIQUID CRYSTAL COPOLYESTERS CONTAINING TEREPHTHALIC ACID AND 2,6-NAPHTHALENEDICARBOXYLIC ACID

[75] Inventors: Winston J. Jackson, Jr.; John C. Morris, both of Kingsport, Tenn.

[73] Assignee: Eastman Kodak Company, Rochester, N.Y.

[21] Appl. No.: 822,989

[22] Filed: Aug. 8, 1977

[51] Int. Cl.² .................... C08G 63/18; C08G 63/66
[52] U.S. Cl. .............................. 528/190; 528/193; 528/194
[58] Field of Search .............. 260/47 C; 528/190, 193, 528/194

[56] References Cited

U.S. PATENT DOCUMENTS

| | | | |
|---|---|---|---|
| 3,637,595 | 1/1972 | Cottis et al. | 260/47 C |
| 3,778,410 | 12/1973 | Kuhfuss et al. | 260/47 C |
| 3,804,805 | 4/1974 | Kuhfuss et al. | 260/47 C |
| 3,884,876 | 5/1975 | Cottis et al. | 260/47 C |
| 4,035,356 | 7/1977 | Jackson, Jr. et al. | 260/47 C |

Primary Examiner—Lester L. Lee
Attorney, Agent, or Firm—William P. Heath, Jr.; Daniel B. Reece, III

[57] ABSTRACT

Disclosed are liquid crystal copolyesters having melting points low enough to allow the copolyesters to be melt-processed in conventional equipment. The copolyesters are prepared from terephthalic acid, 2,6-naphthalenedicarboxylic acid, a diacyl ester of hydroquinone and a p-acyloxybenzoic acid and contain the following divalent radicals:

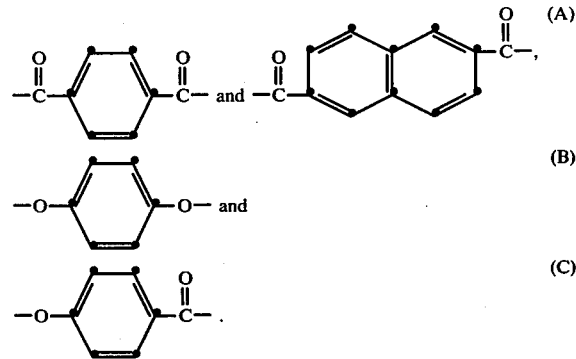

2 Claims, 1 Drawing Figure

LIQUID CRYSTAL COPOLYESTERS CONTAINING TEREPHTHALIC ACID AND 2,6-NAPHTHALENEDICARBOXYLIC ACID

This invention relates to liquid crystal copolyesters which exhibit the exceptionally high mechanical properties typical of liquid crystal polyesters but still have a melting point low enough to allow the copolyesters to be melt-processed into useful articles using commercially available equipment.

In the last four decades, a wide variety of plastics have been developed to fulfill a wide variety of uses. Starting with the commercial introduction of nylon 66 in 1938 and continuing with the introduction of polyacetal, polycarbonate, polyphenylene oxide, polysulfone and polytetramethylene terephthalate, new plastics have been continually introduced to overcome deficiencies in previous plastics. As plastics were developed to satisfy ever more demanding requirements, the aromatic character of the polymer often increased. As the amount of aromatic character increased, the melting point of the polymer increased. Ultimately, the increased melting point of highly aromatic polymers became so high that melt processing the polymer challenged the heating capacity of even the most sophisticated melt spinning and molding equipment and even approached the thermal stability limit of the polymers themselves. Thus, as the demand for polymers with greater and greater mechanical properties was met, the melting point of the polymers generally went up.

In very recent years the never ending search for polymers with greater and greater mechanical properties has resulted in a fundamental breakthrough in polymer science by development of a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to as the liquid crystal state or the nematic phase of the liquid crystal state. These polymers are prepared from monomers which are generally long, flat, and fairly rigid along the long axis of the molecule and have chain extending linkages that are either coaxial or parallel. Some liquid crystal polymers, often called lyotropic liquid crystals, can be brought into the liquid crystal state by dissolving the polymers in a solution, such as the solution spinning of poly(p-phenylene terephthalamide) from a sulfuric solution as disclosed in U.S. Pat. No. 3,671,542. Other liquid crystal polymers, often called thermotropic liquid crystals, can be more advantageously brought into the liquid crystal state by merely changing the temperature of the polymer.

Although the exact structure of liquid crystal polymers has not yet been fully understood, liquid crystal polymers are known to have exceptionally high mechanical properties compared to analogous polymers not having a liquid crystal character. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

As is the case of previous polymers, it was recognized that increasing the aromatic character of a liquid crystal polyester would enhance the general overall balance of mechanical properties. Also, just as with previous polymers, when the aromatic character of the liquid crystal polyesters became greater, the melting points became greater. In the case of previous polymers, the increasing melting point merely challenged the heating capacity of conventional equipment to heat the polymer in order to melt-process the polymer into useful articles. In the case of liquid crystal polyesters, increasing the aromatic character of the polyester created melting points that far exceeded the capability of conventional equipment to melt the polymer. For example, U.S. Pat. No. 3,637,595 discloses that liquid crystal polyesters prepared from terephthalic acid, hydroquinone and varying amounts of p-hydroxybenzoic acid have melting points in the vicinity of 1000° F. and softening points in the general range of 800° to 900° F. Obviously, the melting point of these polymers is far too high and the thermal stability is insufficient to permit these polymers to be used in conventional melt-processing equipment.

The solution to the problem of highly aromatic liquid crystal polyesters having a melting point so high the polyester could not be melt processed in conventional equipment was to lower the melting point to an acceptable level by either incorporating a substitutent on some of the aromatic rings of the polyester, such as by the use of chloro or bromo hydroquinone, or using some aromatic rings having chain extending linkages which were neither parallel or coaxial, such as by the use of isophthalic acid. While these approaches were effective in lowering the melting point, the corresponding reduction in thermal stability or liquid crystal character also reduced the overall balance of properties of the polyester.

We have now accomplished a fundamental breakthrough in liquid crystal polyester technology. We have discovered a wholly aromatic liquid crystal copolyester which has no substitution on any of the aromatic rings and has the chain extending linkages either parallel or coaxial and yet has a melting point that is low enough to permit the copolyester to be melt processed into useful articles, such as fibers and molded articles, using conventional equipment. We have accomplished this remarkable objective of lowering the melting point of a wholly aromatic unsubstituted liquid crystal polyester having the chain extending linkages either coaxial or parallel by substituting 2,6-naphthalenedicarboxylic acid for a portion of the terephthalic acid in a polyester of terephthalic acid, hydroquinone and p-hydroxybenzoic acid known in the art.

Our invention therefore is a copolyester prepared from terephthalic acid, 2,6-naphthalenedicarboxylic acid, a diacyl ester of hydroquinone and a p-acyloxybenzoic acid and can be defined as a copolyester having a fiber forming molecular weight consisting essentially of the following divalent radicals:

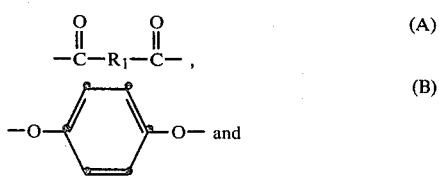

-continued

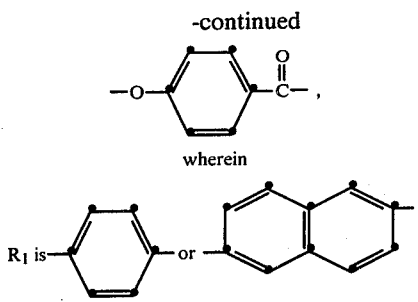

wherein

In this invention the range of

is from 10 to about 60 mole percent, based on the total moles of

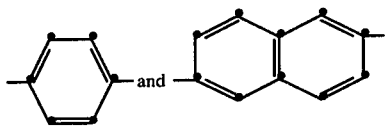

combined and the range of radical (C) is from about 8 to about 70 mole percent, based on the total moles of radical (A), radical (B) and radical (C) combined. In a preferred embodiment the range of radical (C) is from 15 to 50 mole percent.

As will also be recognized by those skilled in the art, divalent radical (A) is the divalent radical remaining after removal of the hydroxyl groups from terephthalic acid and 2,6-naphthalenedicarboxylic acid, divalent radical (B) is the radical remaining after removal of the terminal hydrogen atoms from hydroquinone and divalent radical (C) is the radical remaining after removal of the acyl and hydroxyl groups from a p-acyloxybenzoic acid.

As will also be recognized by those skilled in the art, the chain extending bonds in this copolyester are either parallel, in the case of the radical contributed from 2,6-naphthalenedicarboxylic acid or are coaxial, as in the case of the radical contributed from terephthalic acid, radical (B) and radical (C). Furthermore, it will be recognized that none of the aromatic rings contain a substituent.

Applicants are aware of a large volume of prior art relating to the copolyesters of this invention.

U.S. Pat. No. 3,778,410 discloses a process for preparing a polyester by reacting a polyester prepared from 2,6-naphthalenedicarboxylic acid and hydroquinone with a p-acyloxybenzoic acid.

U.S. Pat. No. 3,890,256 discloses liquid crystal polyesters which are prepared from poly(ethylene 2,6-naphthalenedicarboxylate), hydroquinone and a p-acyloxybenzoic acid and contain the following divalent radicals:

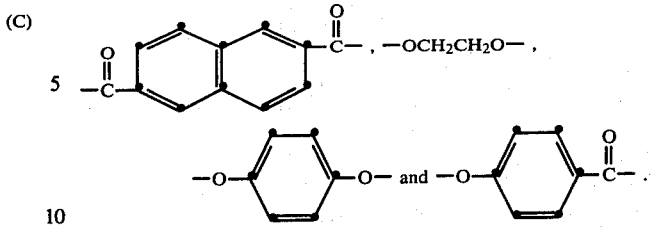

U.S. Pat. No. 3,637,595 discloses liquid crystal copolyesters which are prepared from terephthalic acid, hydroquinone and p-hydroxybenzoic acid and contain the following divalent radicals:

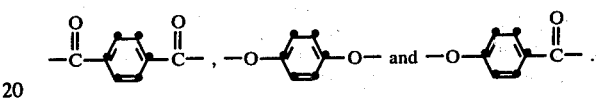

U.S. Pat. No. 3,804,805 discloses liquid crystal polyesters prepared from polyethylene terephthalate and a p-acyloxybenzoic acid.

Belgium Patent No. 828,935 discloses liquid crystal polyesters wherein a substantial portion of the rings in the polymer chain contain a substituent or a substantial portion of the rings in the polymer chain have chain extending linkages which are neither coaxial or parallel.

German Offenlegunsschrift 2,520,820 contains a disclosure similar to Belgium Patent No. 838,935.

U.S. Pat. No. 3,991,013 discloses polyesters prepared from 2,6-naphthalenedicarboxylic acid, a substituted hydroquinone and ethylenedioxy-4,4'-dibenzoic acid.

U.S. Pat. No. 3,991,014 discloses polyesters prepared from 2,6-naphthylenedicarboxylic acid, a substituted hydroquinone and bis(4-carboxyphenyl)ether.

Applicants regard the closest prior art to be U.S. Pat. Nos. 3,778,410; 3,890,256 and 3,637,595.

The copolyesters of this invention are thought to be novel over U.S. Pat. No. 3,778,410 because the claims recite a specific range of divalent radical (C) and also because the process disclosed in this patent cannot be used to prepare the copolyesters of the invention. The copolyesters of this invention are thought to be unobvious over this patent because the process of this patent cannot be used to prepare the copolyesters of this invention. In Column 6, lines 16-19, of this patent, it is reported that the starting polyester and acyloxy aromatic carboxylic acid can be "mixed and heated until molten". This patent reports that reaction temperatures up to 350° C. can be used. Since the melting point of the starting copolyester of 2,6-naphthalenedicarboxylic acid and hydroquinone is considerably higher than 350° C., this starting copolyester cannot be reacted with a p-acyloxybenzoic acid in the process disclosed in the patent.

The copolyesters of this invention are thought to be novel over U.S. Pat. No. 3,890,256 because the polyesters disclosed in this patent contain substantial quantities of ethylene glycol. The polyesters of this invention are thought to be unobvious over this patent for two reasons. First, the process disclosed in this patent cannot be used to prepare the polyesters of this invention. Also, there is no teaching in this patent, or other prior art, that elimination of the ethylene glycol would not radically increase the melting point because elimination of the ethylene glycol would increase the aromatic character of the polyester and it has been known for decades that increasing the aromatic character of a polyester increases its melting point.

The 2,6-naphthalenedicarboxylic acid containing copolyesters of this invention are clearly patentable in view of U.S. Pat. No. 3,637,595 because the copolyesters of this invention have melting points which are unobviously lower than the melting points of the copolyesters of this reference containing only terephthalic acid and no 2,6-naphthalenedicarboxylic acid. Thus, the substitution of 2,6-naphthalenedicarboxylic acid for a portion of the terephthalic acid results in a polymer having unobviously lower melting points.

The precise manner in which the melting points of the terephtahlic acid and 2,6-naphthalenedicarboxylic acid containing copolyesters of the invention are unobviously lower than the melting points of the terephthalic acid containing polyesters of the prior art disclosed in U.S. Pat. No. 3,637,595 is illustrated in the FIGURE.

The FIGURE is a graph showing the relationship between the melting point and the amount of divalent radical

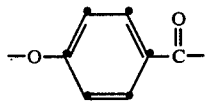

in both the terephthalic acid and 2,6-naphthalenedicarboxylic acid containing copolyesters of the invention and the terephthalic acid containing copolyesters of the prior art disclosed in U.S. Pat. No. 3,637,595.

In the FIGURE the mole percent of divalent radical (C), based on the total amount of divalent radicals (A), (B) and (C) combined, has been plotted on the abscissa. The temperature in degrees Fahrenheit has been plotted on the ordinate. Data points for the melting points have been plotted for both the copolyesters of the invention and the copolyesters of the prior art and suitable curves have been drawn. In the FIGURE the upper curve through the open triangular data points represents the melting points of the copolyesters of the prior art containing only terephthalic acid. This curve has been identified as "100T" to indicate that the dicarboxylic acid was 100 percent terephthalic acid. The family of four lower curves represents the melting points of the copolyesters of the invention. One curve through the closed triangular data points represents the melting points of the copolyesters of the invention containing 60 mole percent 2,6-naphthalenedicarboxylic acid and 40 mole percent terephthalic acid and has been identified as "60N/40T". Other curves containing 50 mole percent 2,6-naphthalenedicarboxylic and 50 mole percent terephthalic acid, 40 mole percent 2,6-naphthalenedicarboxylic acid and 60 mole percent terephthalic acid and 70 mole percent 2,6-naphthalenedicarboxylic acid and 30 mole percent terephthalic acid have been drawn. These curves have been identified as "50N/50T", "40N/60T", and "70N/30T" respectively.

The data for the melting points of the polyesters disclosed in U.S. Pat. No. 3,637,595 were taken directly from Examples 1–4 of the patent where melting points are reported as major endotherm values obtained through differential thermal analysis.

The data for the copolyesters of the invention were obtained by preparing each of the copolyesters using a process known in the art and then determining the melting points of each copolyester.

The copolyesters of the invention were prepared by an acidolysis procedure whereby terephthalic acid, 2,6-naphthalenedicarboxylic acid, a diester of hydroquinone and p-acetoxybenzoic acid are contacted under an increasing temperature ranging up to about 340°–380° C. and a decreasing pressure to form a high molecular weight polymer. As a specific example, the polyester containing 50 mole percent 2,6-naphthalenedicarboxylic acid, 50 mole percent terephthalic acid, and about 18 mole percent divalent radical (C) was prepared by the following procedure.

A mixture of 45.4 grams (0.21 mole) 2,6-naphthalenedicarboxylic acid, 34.9 grams (0.21 mole) terephthalic acid, 93.2 grams (0.42 mole) hydroquinone dipropionate, and 32.4 grams (0.18 mole) p-acetoxybenzoic acid was placed in a 500-ml flask equipped with a stirrer, a short distillation column, and an inlet for nitrogen. The flask was evacuated and purged three times with nitrogen and dried at 100°–110° C. (212°–230° F.) for thirty minutes at <0.3 mm pressure before being immersed in a Wood's metal bath at 275° C. (527° F.). After the mixture was stirred for 20 minutes at 275° C. (527° F.), the temperature was raised to 300–315° C. (527°–598° F.) for 30 minutes and then to 340° C. (644° F.) for 30 minutes. Finally the temperature was raised to 370° C. (698° F.) for 15–20 minutes and a vacuum of 0.5 mm was applied. The polymerization was complete within 20 to 30 minutes. The polymer obtained had a melting point of 360° C. (680° F.).

The other copolyesters containing different balances of 2,6-naphthalenedicarboxylic acid and terephthalic acid and other mole percentages of divalent radical (C) can be prepared by a similar procedure but using slightly different reaction temperatures because of differences in melting points.

Solid-phase polymerization also may be used to increase the molecular weight of the copolyesters of the invention by heating polymer particles in an inert atmosphere or under reduced pressure at a temperature below that at which the particles will become tacky and tend to fuse together. Since this thermal treatment may give polymers with increased crystallinity and melting points, compared to melt phase polymerization, melt phase polymerization is generally preferred. Solid-phase polymerization is preferred, however, if the melting point is above 380° C. (716° F.).

The melting points of the copolyesters of the invention were determined with a Perkin-Elmer DSC-2 differential scanning calorimeter.

Although the melting points of the copolyesters of the invention were determined by a slightly different procedure than that used to determine the melting points of the copolyesters of the prior art, a general comparison of the melting point data of both copolyesters is entirely valid.

As can be fully appreciated from a detailed consideration of the curves in the FIGURE, the melting points of the terephthalic acid and 2,6-naphthalenedicarboxylic acid containing copolyesters of the invention are unobviously low compared to the melting points of the terephthalic acid containing copolyesters of the prior art. For example, consider a typical copolyester of the invention and a typical copolyester of the prior art each containing about 40 mole percent divalent radical

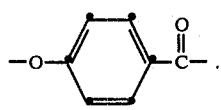

As can be determined from the FIGURE, the melting point of the terephthalic acid containing polyester of the prior art is around 980° F., while the melting point of the polyester of the invention containing 50 mole percent 2,6-naphthalenedicarboxylic acid and 50 mole percent terephthalic acid is around 640° F., or about 340° F. lower than the analogous all terephthalic acid containing polyester. The same general magnitude of difference exists for the melting points of other copolyesters of the invention and the melting points of corresponding copolyesters of the prior art.

This difference in melting point between the copolyesters of the invention and the copolyesters of the prior art is critically important from the commercial standpoint. Commercial equipment suitable for melt-processing the copolyester of the invention into fibers and molded articles is currently available and in commercial use. In contrast, equipment and technology to melt-process the copolyesters of the prior art, having melting points in the vicinity of 1000° F., is not in general commercial use. Also, the polyesters are not thermally stable at temperatures above 800° F.

It would be unobvious that the melting point of a 2,6-naphthalenedicarboxylic acid containing copolyester would be substantially lower than the melting point of the analogous terephthalic acid containing copolyester because one would think the melting point of a 2,6-naphthalenedicarboxylic acid containing copolyester would be about the same as, or higher than, the melting point of the terephthalic acid containing analog because of similarities between the melting points of similar 2,6-naphthalenedicarboxylic acid and terephthalic acid containing polymers. The melting points of 2,6-naphthalenedicarboxylic acid containing polyesters are generally somewhat higher than those of the corresponding terephthalic acid containing polymers. The below table lists the melting points of several randomly selected 2,6-naphthalenedicarboxylic acid containing polyesters and the melting points of the corresponding terephthalic acid containing polymers.

| Polyester Prepared From the Following Diols | Melting Point, °F. | |
|---|---|---|
| | Terephthalate Polyester | 2,6-Naphthalene-dicarboxylate Polyester |
| 1,2-ethanediol | 493 | 512 |
| 1,4-butanediol | 430 | 466 |
| 1,6-hexanediol | 298 | 417 |
| 1,4-cyclohexanedimethanol (70/30 trans/cis) | 545 | 648 |
| p-xylenediol | 496 | 518 |
| hydroquinone | 1105 | 1070 |

All the polymers except the hydroquinone containing polymers were prepared by conventional ester interchange procedures using the indicated diols and the dimethyl ester of the indicated dicarboxylic acids. Melting points were conventionally determined.

The hydroquinone containing polymers were prepared from the dicarboxylic acid and the dipropionate ester of hydroquinone by a conventional acidolysis procedure similar to that used to prepare the copolyesters of the invention. In this procedure, the polymers, which solidified while the metal bath temperature was at 320° C., were ground into particles and solid phased under reduced pressure from 180° to 280° C. for several hours, then at 295° C. for 3 hours, 315° C. for 1 hour and 350° C. for 2 hours. The melting points of these polymers were determined using a Perkin-Elmer DSC-2 differential scanning calorimeter and a scan rate of 80° C./min. to minimize thermal decomposition. As in the work reported in U.S. Pat. No. 3,637,595, several endotherm values for both of the polymers were observed, and the higher endotherm value is regarded to be the melting point.

As shown in the above table, the melting points of 2,6-naphthalenedicarboxylic acid containing polyesters are similar to or somewhat higher than the corresponding terephthalic acid containing polyesters. Accordingly, it would be assumed that the melting points of the 2,6-naphthalenedicarboxylic acid containing polyesters of the invention would be about the same as, or somewhat higher than, the terephthalic acid containing polyester of the prior art disclosed in U.S. Pat. No. 3,637,595. Quite surprisingly, the melting points of the polyesters of the invention are much lower than those of the prior art.

A wide variety of diesters of hydroquinone can be used to prepare the copolyesters of this invention. Examples of diesters of hydroquinone include the diacetate, dipropionate, dibutyrate and dibenzoate. The diacetate and dipropionate are preferred.

The p-acyloxybenzoic acid that provides radical (C) in the copolyesters of this invention corresponds to the structure

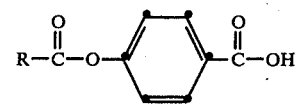

wherein R is phenyl or a monovalent alkyl radical of 1 to 8, preferably 1 to 4, carbon atoms. Examples of p-acyloxybenzoic acids include p-acetoxybenzoic acid, p-propionyloxybenzoic acid, p-butyryloxybenzoic acid, and p-phenoxybenzoic acid. Preferably, R is a monovalent alkyl radical having one carbon atom, in which case the p-acyloxybenzoic acid is p-acetoxybenzoic acid.

The p-acyloxybenzoic acids can be prepared by conventional processes, such as reaction between p-hydroxybenzoic acid and a carboxylic anhydride, such as acetic anhydride. Other processes for preparation of the p-acyloxybenzoic aromatic carboxylic acids are well known in the art.

The copolyesters of this invention are described as "consisting essentially of" the various radicals. By the term "consisting essentially of" we mean that the copolyester can contain other divalent radicals, even in significant amounts, as long as the softening and melting points of the copolyesters of the invention remain unobvious in view of the softening and melting points of the copolyesters of the prior art. For example, minor amounts of other naphthalenedicarboxylic acid isomers, such as 2,7-, 1,4-, 1,5- and 1,6-, can be used in addition to the 2,6-isomer. Also, dicarboxylic acids other than terephthalic acid and 2,6-naphthalenedicarboxylic acid, for example isophthalic acid, and diols other than hydroquinone can be used. Similarly, a portion of the p-acyloxybenzoic acid can be replaced with m-acyloxybenzoic acid. By the term "consisting essentially of" we mean also that the copolyesters of this invention may contain nucleating agents, fillers, pigments, glass fibers, asbestos fibers, antioxidants, stabilizers, plasticizers, lubricants, fire-retardants, and other additives.

The inherent viscosity of the copolyesters of this invention cannot be determined because the copolyesters of this invention are insoluble in typical solvents used for determining inherent viscosity. Although the inherent viscosity of the copolyesters of the invention has not been measured, the molecular weights of the copolyesters of the invention are high enough to be in the fiber forming range. The minimum fiber forming molecular weight of the polymer is thought to be around 5,000. In most cases copolyesters of the invention have molecular weights above 8,000 and can have molecular weights as high as around 20,000 and in some instances the molecular weights can range up to 25,000 or even higher.

We claim:

1. A copolyester having a fiber forming molecular weight consisting essentially of the following divalent radicals:

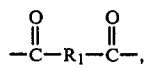 (A)

 (B)

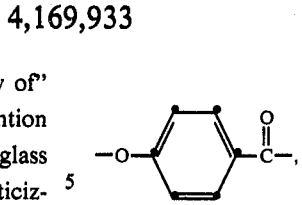 (C)

wherein $R_1$ is

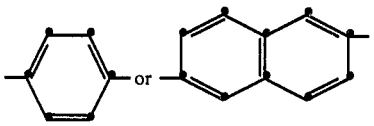

and the range of

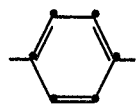

is from 10 to about 60 mole percent, based on the total moles of

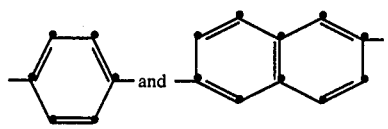

combined, and the range of radical (C) is from about 8 to about 70 mole percent, based on the total moles of radical (A), radical (B) and radical (C) combined.

2. The copolyester of claim 1 wherein the range of radical (C) is from 15 to 50 mole percent.

* * * * *

UNITED STATES PATENT AND TRADEMARK OFFICE
CERTIFICATE OF CORRECTION

PATENT NO. : 4,169,933
DATED : October 2, 1979
INVENTOR(S) : Winston J. Jackson, Jr. and John C. Morris It is certified that error appears in the above-identified patent and that said Letters Patent are hereby corrected as shown below:

Column 9, Claim 1, line 35, add "A" before the structure

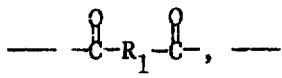

Column 9, Claim 1, line 38, add "B" before the structure

Column 10, Claim 1, line 4, add "C" before the structure

Signed and Sealed this

Twenty-second Day of April 1980

[SEAL]

Attest:

Attesting Officer

SIDNEY A. DIAMOND

Commissioner of Patents and Trademarks